US011407865B2

(12) United States Patent
Oh et al.

(10) Patent No.: US 11,407,865 B2
(45) Date of Patent: Aug. 9, 2022

(54) BASALT-FIBER-REINFORCED THERMOPLASTIC COMPOSITE MATERIAL AND METHOD OF MANUFACTURING THE SAME

(71) Applicants: Hyundai Motor Company, Seoul (KR); Kia Motors Corporation, Seoul (KR); Korea Advanced Institute of Science and Technology, Daejeon (KR)

(72) Inventors: Kyung Hwan Oh, Seoul (KR); Soon Hyung Hong, Daejeon (KR); Si Won Yu, Daejeon (KR); Jae Min Cha, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/158,236

(22) Filed: Jan. 26, 2021

(65) Prior Publication Data

US 2021/0147643 A1    May 20, 2021

Related U.S. Application Data

(62) Division of application No. 15/822,033, filed on Nov. 24, 2017, now Pat. No. 10,934,401.

(30) Foreign Application Priority Data

Jun. 21, 2017 (KR) .................. 10-2017-0078408

(51) Int. Cl.
| | | |
|---|---|---|
| *C08J 5/06* | (2006.01) | |
| *C08J 5/04* | (2006.01) | |
| *C08K 9/06* | (2006.01) | |
| *C08K 7/10* | (2006.01) | |
| *C08J 3/20* | (2006.01) | |
| *C08J 3/28* | (2006.01) | |
| *C08L 67/02* | (2006.01) | |

(52) U.S. Cl.
CPC ............... *C08J 5/06* (2013.01); *C08J 3/203* (2013.01); *C08J 3/28* (2013.01); *C08J 5/0405* (2021.05); *C08K 7/10* (2013.01); *C08K 9/06* (2013.01); *C08L 67/02* (2013.01); *C08J 2377/06* (2013.01)

(58) Field of Classification Search
CPC .................................. C08J 5/06; C08J 5/0405
See application file for complete search history.

(56) References Cited

U.S. PATENT DOCUMENTS 8,911,140 B2 *  12/2014  Du ................... C09D 163/00
366/108

FOREIGN PATENT DOCUMENTS

| CN | 101125738 A | 2/2008 | |
|---|---|---|---|
| CN | 103289376 A | 9/2013 | |
| CN | 103483801 A | 1/2014 | |
| CN | 103509354 A | 1/2014 | |
| CN | 104692027 A | 6/2015 | |
| CN | 105802142 A * | 7/2016 | ........... B29B 15/125 |
| CN | 106700393 A | 5/2017 | |
| CN | 106854343 A | 6/2017 | |
| JP | 2007291226 A | 11/2007 | |
| KR | 10-0262660 B1 | 8/2000 | |
| KR | 10-2015-0069508 A | 6/2015 | |
| KR | 10-2015-0073831 A | 7/2015 | |
| KR | 10-1538032 B1 | 7/2015 | |

OTHER PUBLICATIONS

Machine translation CN 106854343 A, published Jun. 16, 2017 <<retrieved from Espcaneton Dec. 2, 2021 >>. (Year: 2017).*
Machine translation CN 105802142 A, published Jul. 27, 2016 <<retrieved from Espcaneton Dec. 2, 2021 >>. (Year: 2016).*
Machine translation of CN 103483801 (A), Published Jan. 1, 2014 (Year: 2014).
Machine translation of CN 101125738 (A), Published Feb. 20, 2008 (Year: 2008).
Machine translation of CN 103509354 (A), Retrieved Jun. 11, 2020.
Machine translation of CN 103289376 (A), Published Sep. 11, 2013.
Polymer-Plastics Technology and Engineering Publication details, including instructions for authors and subscription information: http://www.tandfonline.com/Ioi/Ipte20.

* cited by examiner

*Primary Examiner* — Vickey Nerangis
(74) *Attorney, Agent, or Firm* — Morgan, Lewis & Bockius LLP

(57) ABSTRACT

A basalt-fiber-reinforced thermoplastic composite material may include a thermoplastic resin and a basalt fiber as a reinforcement, wherein the basalt fiber is surface-treated with an alkoxy-group-substituted silane compound.

4 Claims, 2 Drawing Sheets

BASALT-FIBER-REINFORCED THERMOPLASTIC COMPOSITE MATERIAL AND METHOD OF MANUFACTURING THE SAME

CROSS-REFERENCE TO RELATED APPLICATION

The present application is a Divisional of U.S. patent application Ser. No. 15/822,033, filed Nov. 24, 2017, which claims priority to Korean Patent Application No. 10-2017-0078408 filed on Jun. 21, 2017, the entire contents of which are incorporated herein for all purposes by these references.

BACKGROUND OF THE INVENTION

Field of the Invention

The present invention relates to a basalt-fiber-reinforced thermoplastic composite material and a method of manufacturing the same, and more particularly to a basalt-fiber-reinforced thermoplastic composite material and a method of manufacturing the same. The surface-treated basalt fiber of the present invention is used in order to impart superior interfacial adhesion even to a matrix comprising a thermoplastic resin, especially an engineering plastic (EP), thereby improving various properties of the composite material, such as tensile strength, flexural strength, flexural modulus, impact strength, and the like.

Description of Related Art

With the recent diversification and specialization of industries such as automobiles, construction/civil engineering, aerospace, etc., composite materials having specific functions, such as high strength, high heat resistance, high elasticity, and the like, are receiving great attention, and markets related thereto are also rapidly expanding. In the field of automobiles, an increase in fuel efficiency is regarded as important due to strict environmental regulations, and thus a lightweight composite material is required. Accordingly, demand for a fiber-reinforced plastic composite material having high strength and high heat resistance so as to be capable of replacing metal is greatly increasing. The matrix of the fiber-reinforced composite material mainly includes a thermosetting resin such as epoxy. Also, the reinforcement of the fiber-reinforced composite material typically includes glass fiber (GF), and aramid fiber (AF) or carbon fiber (CF) is mainly applied to some high-functional parts.

However, due to the development of high-speed molding manufacturing technology together with the mass production and supply in response to the drastic growth of composite material product markets these days, many attempts are being made to replace a thermosetting resin, typically serving as a matrix, with a thermoplastic resin. Furthermore, materials that are recyclable and reusable should be taken into consideration due to increased interest in environmental protection, and thus a fiber-reinforced composite material including a matrix comprising an engineering plastic (EP), which is a thermoplastic resin having desirable properties and good re-processability, is receiving attention as an ideal material. The use of glass fiber, which is a potential carcinogen, is limited, and aramid fiber and carbon fiber have high barriers to entry due to technological protectionism of developed countries and are expensive, making it difficult to use the same as industrial materials. Recently, interest in the use of basalt fiber (BF) as the reinforcement in lieu of glass fiber has come to the fore.

Basalt fiber is obtained by melting basalt at 1500° C. and spinning fine fiber having a diameter of 9 to 12 μm, and is typically composed of 43 to 53% of silicon dioxide ($SiO_2$), 12 to 16% of alumina ($Al_2O_3$), 6 to 18% of iron oxide (FeO, $Fe_2O_3$, $Fe_3O_4$), 10 to 20% of alkaline earth metal, and 2 to 8% of alkali metal. Basalt fiber is non-toxic and is environmentally friendly because it does not cause pulmonary fibrosis and is not carcinogenic. Also, basalt fiber is advantageous in that less energy is consumed compared to glass fiber upon fiber production and it has superb mechanical properties (strength, rigidity), heat resistance (fireproofing, thermal insulation, heat resistance), blocking properties (soundproofing, sound absorption, moisture proofing), wear resistance, and chemical resistance (erosion resistance, corrosion resistance). Although Eastern Europe and the like are major suppliers of basalt reserves, basalt reserves are sufficiently rich in Cheolwon, Korea, and thus it is expected that the domestic market will be greatly expanded because domestic production is possible without importing raw materials in the future.

Table 1 below shows the properties and supply prices of basalt fiber, glass fiber and carbon fiber, which are reinforcements for use in the composite materials.

TABLE 1

| | Properties and prices of reinforcements | | | |
|---|---|---|---|---|
| Items | Basalt fiber | E-glass fiber | S-glass fiber | Carbon fiber |
| Strength (GPa) | 3.00~4.84 | 3.40~3.50 | 4.02~4.65 | 3.5~6.0 |
| Modulus (GPa) | 93~110 | 72~74 | 83~86 | 230~600 |
| Elongation (%) | 3.5 | 3.02 | 2.5 | 1.4~1.8 |
| Density (g/cm$^3$) | 2.6~2.8 | 2.54 | 2.49 | 1.80 |
| Melting point (° C.) | 1220 | 1064 | 1500 | — |
| Fiber forming temperature (° C.) | 1300 | 1200 | 1565 | — |
| Price (€/kg) | 2~3 | 1~2 | 8~10 | 15~30 |

Recently, research into composite materials using basalt fiber as a reinforcement and patent applications therefor are ongoing, but the techniques thereof are still at the early stage, and in particular, domestic research is still poor.

Specifically, reported techniques for increasing the rigidity and heat resistance of resin by adding a polymer resin with basalt fiber are as follows.

Korean Patent No. 10-0262660 discloses a polymer composite material, in which basalt fiber is impregnated with a mixture of a polyester resin and a phenol-formaldehyde resin and which is a thermosetting resin using a prepreg process, making it unsuitable to achieve mass production and recyclability.

Korean Patent No. 10-1538032 discloses a fiber-reinforced composite material and a method of manufacturing the same, in which a fabric including basalt fiber is used as the reinforcement. The composite material disclosed in this patent is greatly different in the performance and manufacturing method thereof from the composite material of the present invention using basalt fiber in short fiber form.

Korean Patent Application Publication No. 10-2015-0069508 discloses a composite material, in which basalt fiber and an epoxy resin are added with montmorillonite nanopowder to thus exhibit effectively improved mechanical properties (especially tensile strength and wear resistance).

However, amount of the nanopowder that is loaded in the resin is increased, thus deteriorating fluidity and flowability, which is undesirable.

Korean Patent Application Publication No. 10-2015-0073831 discloses a master batch chip including a thermoplastic resin and basalt short-fiber and a method of manufacturing the same, but the increase in interfacial adhesion between the fiber and the resin is still insufficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a basalt-fiber-reinforced thermoplastic composite material and a method of manufacturing the same, in which the basalt-fiber-reinforced thermoplastic composite material is configured such that a thermoplastic resin, serving as a matrix, and specific surface-treated basalt fiber, serving as a reinforcement, are complexed.

Various aspects of the present invention are directed to providing a basalt-fiber-reinforced thermoplastic composite material, comprising a thermoplastic resin as a matrix and, as a reinforcement, basalt fiber that is surface-treated with an alkoxy-group-substituted silane compound.

In addition, various aspects of the present invention are directed to providing a basalt-fiber-reinforced thermoplastic composite material, comprising a thermoplastic resin as a matrix, and, as a reinforcement, basalt fiber that is surface-treated with an alkoxy-group-substituted silane compound and further with plasma under the condition that oxygen ($O_2$) is fed.

In addition, various aspects of the present invention are directed to providing a method of manufacturing a basalt-fiber-reinforced thermoplastic composite material, comprising: 1) impregnating basalt fiber with a dipping solution including an alkoxy-group-substituted silane compound so that the basalt fiber is surface-treated with the silane compound; and 2) complexing the surface-treated basalt fiber with a thermoplastic resin.

In addition, various aspects of the present invention are directed to providing a method of manufacturing a basalt-fiber-reinforced thermoplastic composite material, comprising: 1-A) impregnating basalt fiber with a dipping solution including an alkoxy-group-substituted silane compound so that the basalt fiber is surface-treated with the silane compound; 1-B) subjecting the basalt fiber surface-treated with the silane compound to plasma surface treatment under the condition that oxygen gas ($O_2$) is fed; and 2) complexing the surface-treated basalt fiber with a thermoplastic resin.

According to an exemplary embodiment of the present invention, a basalt-fiber-reinforced thermoplastic composite material is configured such that basalt fiber is uniformly distributed in a matrix comprising a thermoplastic resin, especially an engineering plastic (EP), and has high interfacial adhesion between the resin and the fiber. The basalt-fiber-reinforced thermoplastic composite material of the present invention has low specific gravity and is simultaneously improved in tensile strength, flexural strength, flexural modulus, impact strength, and the like.

Conventionally, a prepreg process and a master batch fabrication process are performed in order to manufacture a composite material having improved properties. In an exemplary embodiment of the present invention, however, in order to achieve uniform dispersion of the basalt fiber in the thermoplastic resin matrix and high interfacial adhesion therebetween, basalt fiber is subjected to chemical surface treatment using a silane compound, which is selected as an optimal surface treating agent in consideration of the surface characteristics of the basalt fiber, or is subjected to additional plasma optical surface treatment using oxygen ($O_2$) after treatment with a silane compound. Therefore, the method of manufacturing the composite material according to an exemplary embodiment of the present invention is effective at reproducibly obtaining a basalt-fiber-reinforced thermoplastic composite material having low specific gravity and superior properties, such as tensile strength, flexural strength, flexural modulus, impact strength, and the like.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
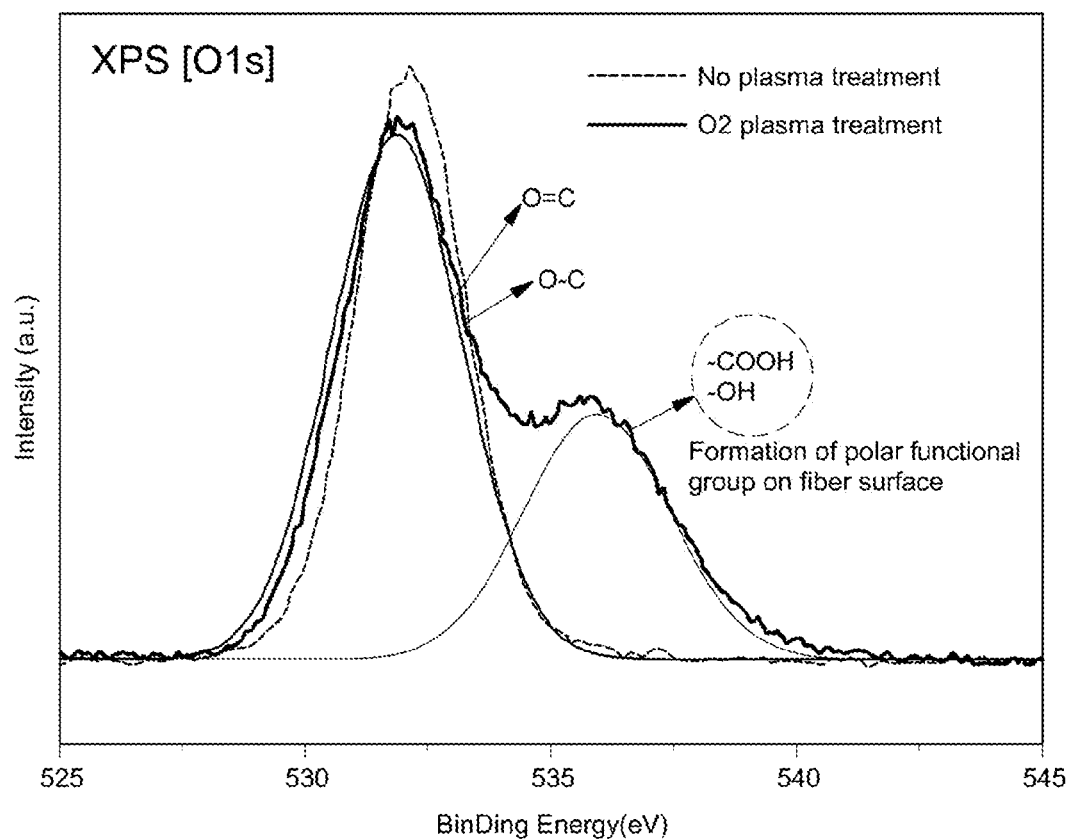
FIG. 1 shows the results of X-ray photoelectron spectroscopy (XPS) for the controlled surface polarity of basalt fiber by subjecting the basalt fiber to surface treatment with a silane compound and then to plasma treatment.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In an exemplary embodiment of the present invention, the surface characteristics of basalt fiber are controlled by subjecting the basalt fiber to surface treatment with a silane compound or to additional plasma surface treatment using oxygen ($O_2$) after surface treatment with a silane compound, thereby inducing uniform dispersion of the basalt fiber in the thermoplastic resin matrix and high interfacial adhesion therebetween.

According to an exemplary embodiment of the present invention, the basalt-fiber-reinforced thermoplastic composite material is described in detail below.

The composite material of the present invention includes a thermoplastic resin and surface-treated basalt fiber. Specifically, the composite material of the present invention comprises about 50 wt % to about 90 wt % (e.g., about 50 wt %, about 55 wt %, about 60 wt %, about 65 wt %, about 70 wt %, about 75 wt %, about 80 wt %, about 85 wt %, or about 90 wt %) of the thermoplastic resin and about 10 wt % to about 50 wt % (e.g., about 10 wt %, about 15 wt %, about 20 wt %, about 25 wt %, about 30 wt %, about 35 wt %, about 40 wt %, about 45 wt %, or about 50 wt %) of the surface-treated basalt fiber.

Also, the composite material of the present invention may further comprise a typically useful additive, such as a heat-resistant stabilizer, a lubricant, an antioxidant, etc. In various exemplary embodiments, the heat-resistant stabilizer is added to maintain long-term heat resistance of parts, and may be contained in an amount of about 0.1 wt % to about 1.0 wt % (e.g., about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt %) based on the total weight of the composite material. The lubricant is added to induce efficient flow of the composite material upon extrusion or injection processing, and may be contained in an amount of about 0.1 wt % to about 1.0 wt % based on the total weight of the composite material. The antioxidant is added to prevent the degradation of the composite material and may be contained in an amount of about 0.1 wt % to about 1.0 wt % based on the total weight of the composite material.

The composite material of the present invention includes a thermoplastic resin as the matrix. Specifically, the thermoplastic resin may be at least one engineering plastic selected from the group consisting of polylactic acid, acrylonitrile butadiene styrene, polypropylene, polyethylene, polystyrene, polyamide, polycarbonate, polyvinyl chloride, chlorinated polyvinyl chloride, styrene acrylonitrile, an acrylic-styrene-acrylonitrile terpolymer (acrylonitrile styrene acrylate), polysulfone, polyurethane, polyphenylene sulfide, polyacetal, polyaramide, polyimide, polyester, a polyester elastomer, ester acrylate, an ethylene-propylene copolymer, a styrene-butadiene copolymer, and a vinyl acetate-ethylene copolymer. In an exemplary embodiment of the present invention, the selection of the thermoplastic resin is not particularly limited, and the use of polyamide resin such as nylon 6 or nylon 66 is preferable in terms of improving the properties of the composite material.

The composite material of the present invention comprises the surface-treated basalt fiber. In various exemplary embodiments, the basalt fiber is obtained by melting basalt at 1500° C. and then spinning fiber. In some instances, the basalt fiber has a diameter of about 10 μm to 30 μm (e.g., about 10 μm, about 12 μm, about 14 μm, about 16 μm, about 18 μm, about 20 μm, about 22 μm, about 24 μm, about 26 μm, about 28 μm, or about 30 μm) and a length of about 1 to 20 mm (e.g., about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm).

In order to achieve uniform dispersion of the basalt fiber in the matrix and high interfacial adhesion therebetween, the composite material of the present invention includes surface-treated basalt fiber. The surface-treated basalt fiber is obtained by performing optimal surface treatment taking into consideration the surface characteristics of the basalt fiber as the reinforcement and the characteristics of the thermoplastic resin as the matrix.

In an exemplary embodiment of the present invention, the basalt fiber is subjected to surface treatment, including chemical surface treatment using an alkoxy-group-substituted silane compound or additional plasma optical surface treatment using oxygen ($O_2$).

The silane compound, which is used to perform chemical surface treatment of the basalt fiber of the present invention, is a compound in which at least one alkoxy group is substituted, and is specifically represented by Chemical Formula 1 below.

[Chemical Formula 1]

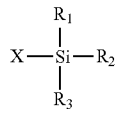

In Chemical Formula 1,

X is selected from among a halogen atom, a mercapto group, —$C_1$ to $C_{10}$ alkyl-$NR^aR^b$, —$C_1$ to $C_{10}$ alkyl-NHC(O)$NH_2$, —$C_1$ to $C_{10}$ alkyl-NCO, an epoxy group, a vinyl group, a styryl group, and —$C_1$ to $C_{10}$ alkyl-S—S—S—S—$C_1$ to $C_{10}$ alkyl-Si ($R_1R_2R_3$);

$R_1$, $R_2$ and $R_3$, which are the same as or different from each other, are each selected from among a hydroxyl group, a $C_1$ to $C_{10}$ alkyl group, an acryloxy $C_1$ to $C_{10}$ alkyl group, a methacryloxy $C_1$ to $C_{10}$ alkyl group, and a $C_1$ to $C_{10}$ alkoxy group, at least one of $R_1$, $R_2$ and $R_3$ being an alkoxy group; and $R^a$ and $R^b$, which are the same as or different from each other, are each selected from among a hydrogen atom, a $C_1$ to $C_{10}$ alkyl group, $C_2$ to $C_{10}$ alkenyl, and a phenyl group.

The silane compound may be classified into four types, such as chlorosilane, alkoxysilane, silazane, and organo-functional silane, depending on the kind of functional group. Furthermore, the silane compound may be classified into those having an interfacial function, a surface function, and an internal function, depending on the end use thereof.

More specifically, the silane compound, which is used to perform chemical surface treatment of the basalt fiber of the present invention, may include at least one selected from the group consisting of vinyl-based silane, including vinyltrimethoxysilane and vinyltriethoxysilane; epoxy-based silane, including 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane; styrene-based silane, including p-styryltrimethoxysilane; methacryl-based silane, including 3-methacryloxypropylmethyldimethoxysilane, 3-methacryloxypropyltrimethoxysilane, 3-methacryloxypropylmethyldiethoxysilane, and 3-methacryloxypropyltriethoxysilane; acryl-based silane, including 3-acryloxypropyltrimethoxysilane; amine-based silane, including N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, N-phenyl-3-aminopropyltriethoxysilane, 3-triethoxysilyl-N-(1,3-dimethyl-butylidene)propylamine, and N-(vinylbenzyl)-2-aminoethyl-3-aminopropyltrimethoxysilane hydrochloride; isocyanuric acid-based silane, including tris(trimethoxysilylpropyl)isocyanurate; ureido-based silane, including 3-ureidopropyltrimethoxysilane; mercapto-based silane, including 3-mercaptopropylmethyl dimethoxysilane and 3-mercaptopropyltrimethoxysilane; sulfide-based silane, including bis(triethoxysilylpropyl)tetrasulfide; and isocyanate-based silane, including 3-isocyanatopropyltriethoxysilane.

Among examples of the silane compound, an amine-based silane compound is preferably used. This is because a hydrolysis process is relatively easy, and the amine group, which is a polar functional group existing at the chain terminal, may form a strong hydrogen bond with a matrix, thereby further improving the properties of the composite material.

The amount of the silane compound that is used for chemical surface treatment of the basalt fiber may be set to the range of about 0.1 wt % to about 10 wt % (e.g., about 0.1 wt %, 0.5 wt %, about 1.0 wt %, about 1.5 wt %, about 2.0 wt %, 2.5 wt %, about 3.0 wt %, about 3.5 wt %, about 4.0 wt %, about 4.5 wt %, about 5.0 wt %, 5.5 wt %, about 6.0 wt %, about 6.5 wt %, about 7.0 wt %, about 7.5 wt %, about 8.0 wt %, 8.5 wt %, about 9.0 wt %, about 9.5 wt %, or about 10 wt %) based on the total weight of the composite material. If the amount of the silane compound is less than 0.1 wt % based on the total weight of the composite material, uniform dispersion of the reinforcement in the matrix and high interfacial adhesion therebetween may not be expected. On the other hand, if the amount of the silane compound exceeds 10 wt % based on the total weight of the composite material, the effect of improving the properties is low despite the excessive use thereof, and the properties may instead be worsened.

In an exemplary embodiment of the present invention, in order to perform surface treatment of the basalt fiber, plasma optical surface treatment may be additionally conducted using oxygen gas ($O_2$) after chemical surface treatment using the alkoxy-group-substituted silane compound.

The plasma surface treatment is carried out in a manner in which active high-energy particles in various forms, such as ions, radicals, excited atoms, excited molecules, etc., are made to collide with the fiber surface. The plasma treatment may exhibit an etching effect for removing impurities and a water layer from the fiber surface, an effect of increasing fiber surface tension, an effect of increasing wettability, hydrophilicity and adhesion by increasing the activity of the fiber surface, and an effect of increasing water repellency and water permeability by making the fiber surface hydrophobic.

Through plasma surface treatment in an exemplary embodiment of the present invention, interfacial adhesion between the thermoplastic resin matrix and the basalt fiber reinforcement may be effectively maximized. The process factors for plasma surface treatment may include (1) a processing gas, (2) a monomer, (3) a flow rate, (4) an applied plasma power, and (5) a processing time.

The plasma surface treatment effect is greatly dependent on the plasma intensity and the processing time. Since the basalt fiber is used, the plasma intensity is set to the range of about 10 W to about 600 W, preferably about 50 W to about 200 W, and more preferably about 100 W to about 180 W. The plasma processing time is set to the range of about 1 sec to about 600 sec, preferably about 30 sec to about 120 sec and more preferably about 30 sec to about 90 sec.

Also, in order to further maximize the interfacial adhesion of the basalt fiber to the thermoplastic resin matrix through plasma surface treatment, selecting the processing gas and the monomer may be regarded as important. In an exemplary embodiment of the present invention, oxygen gas ($O_2$) is used as the plasma processing gas, and the silane compound defined as above is used as the monomer. The oxygen gas may be fed at a flow rate of about 10 sccm to about 300 sccm, preferably about 25 sccm to about 75 sccm, and more preferably about 25 sccm to about 50 sccm.

As necessary, the oxygen gas ($O_2$) may be fed together with an inert gas. The inert gas may be at least one selected from the group consisting of hydrogen, nitrogen and argon. When the active oxygen gas and the inert gas are fed together, the plasma processing effect may be further maximized. The inert gas may be fed at a flow rate of about 10 sccm to about 300 sccm, preferably about 50 sccm to about 150 sccm, and more preferably about 80 sccm to about 120 sccm.

As necessary, a fluorine-containing molecular gas may be fed. The fluorine-containing molecular gas may include at least one selected from the group consisting of tetrafluoromethane ($CF_4$), trifluoromethane ($CHF_3$), dichlorodifluoromethane ($CF_2Cl_2$), chlorotrifluoromethane ($CF_3Cl$), hexafluoroethane ($C_2F_6$), pentafluoroethane ($CF_3CHF_2$), 1,1,1,2-tetrafluoroethane ($CF_3CFH_2$), octafluoropropane ($C_3F_8$), 1,1,1,2,3,3,3-heptafluoropropane ($CF_3CHFCF_3$), 1,1,1,3,3-pentafluoropropane ($CF_3CH_2CHF_2$), 1,1,1,3,3-pentafluorobutane ($CF_3CH_2CF_2CH_3$), nitrogen trifluoride ($NF_3$), and sulfur hexafluoride ($SF_6$). The fluorine-containing molecular gas may be fed at a flow rate of about 10 sccm to about 300 sccm, preferably about 50 sccm to about 150 sccm, and more preferably about 80 sccm to about 120 sccm.

Through the plasma surface treatment, the silane compound is subjected to gaseous graft polymerization or polymer deposition on the surface of the basalt fiber and is thereby contained as the reinforcement of the composite material, ultimately increasing interfacial adhesion to the thermoplastic resin.

The plasma treatment process is advantageous because it is carried out within a short time through a one-step process without pretreatment/post-treatment due to the properties of plasma and also because the reinforcement having uniform surface and certain quality may be supplied without changing the inherent properties of the basalt fiber, so long as plasma processing conditions optimal for the basalt fiber are provided.

FIG. 1 shows the results of XPS for the formation of the polar functional group on the surface of the basalt fiber by subjecting the basalt fiber to surface treatment with the silane compound and then additional plasma surface treatment. As shown in FIG. 1, a radical having high active energy is formed on the surface of the basalt fiber through plasma treatment, and may react with oxygen in the air, thereby producing a hydroxyl group (—OH), a carboxyl group (—COOH), or a carbonyl group (C=O).

In addition, the present invention addresses a method of manufacturing a basalt-fiber-reinforced thermoplastic composite material, the method comprising complexing a thermoplastic resin matrix and a surface-treated basalt fiber reinforcement.

The method of manufacturing the composite material according to an exemplary embodiment of the present invention may include 1-A) impregnating basalt fiber with a dipping solution including an alkoxy-group-substituted silane compound so that the basalt fiber is surface-treated with the silane compound; and 2) complexing the surface-treated basalt fiber with a thermoplastic resin.

In addition, the method of manufacturing the composite material according to an exemplary embodiment of the present invention may include 1-A) impregnating basalt fiber with a dipping solution including an alkoxy-group-substituted silane compound so that the basalt fiber is surface-treated with the silane compound;

1-B) subjecting the basalt fiber surface-treated with the silane compound to plasma surface treatment under the condition that oxygen ($O_2$) is fed; and 2) complexing the surface-treated basalt fiber with a thermoplastic resin.

The method of manufacturing the composite material according to an exemplary embodiment of the present invention is stepwisely described in detail below.

1-A) Surface treatment of basalt fiber with silane compound

The silane compound treatment on the surface of the basalt fiber may be performed through a solution dipping process.

Specifically, the silane compound is diluted at a concentration of about 0.1 wt % to about 0.5 wt % (e.g., about 0.1 wt %, about 0.2 wt %, about 0.3 wt %, about 0.4 wt %, or about 0.5 wt %) in a solvent and hydrolyzed to give a dipping solution. The solvent may be water, an aliphatic alcohol or a mixed solvent thereof. The solvent is preferably a mixed solvent of aliphatic alcohol and water, and the weight ratio of aliphatic alcohol and water, which are mixed together, may range from 70 to 99:1 to 30, such as, but not limited to 70:1, 99:1, 70:30, 99:30, 75:10, 80:20, and the like. Here, the aliphatic alcohol may be a $C_1$ to $C_5$ alcohol, including methanol, ethanol, propanol, and butanol.

The dipping solution thus prepared is used to sufficiently impregnate the basalt fiber. After the completion of the impregnation, the basalt fiber is taken out of the dipping solution and then thoroughly dried. The impregnation is performed at about 20° C. to about 30° C. for about 1 to about 5 hr. The drying is performed at about 100° C. to about 150° C. for about 10 min to about 2 hr.

1-B) Plasma treatment of basalt fiber surface-treated with silane compound

The plasma treatment is performed in order to subject the silane compound impregnated on the surface of the basalt fiber to gaseous graft polymerization or polymer deposition. Such plasma treatment may be conducted using a continuous room-temperature atmospheric-pressure plasma device.

Specifically, the basalt fiber to be surface-treated is placed in a chamber and oxygen gas, serving as an active gas, is fed under a predetermined plasma power, or alternatively, oxygen gas ($O_2$) and an inert gas and/or a fluorine-containing molecular gas may be fed.

Here, the plasma surface treatment may be performed at an oxygen gas ($O_2$) flow rate of about 10 sccm to about 300 sccm (e.g., about 10 sccm, about 25 sccm, about 50 sccm, about 75 sccm, about 100 sccm, about 110 sccm, about 125 sccm, about 150 sccm, about 175 sccm, about 200 sccm, about 210 sccm, about 225 sccm, about 250 sccm, about 275 sccm, or about 300 sccm), an inert gas and/or fluorine-containing molecular gas flow rate of about 10 sccm to about 300 sccm (e.g., about 10 sccm, about 25 sccm, about 50 sccm, about 75 sccm, about 100 sccm, about 110 sccm, about 125 sccm, about 150 sccm, about 175 sccm, about 200 sccm, about 210 sccm, about 225 sccm, about 250 sccm, about 275 sccm, or about 300 sccm), a plasma intensity of about 10 W to about 600 W (e.g., about 10 W, about 50 W, about 100 W, about 125 W, about 150 W, about 175 W, about 200 W, about 225 W, about 250 W, about 275 W, about 300 W, about 325 W, about 350 W, about 375 W, about 400 W, about 425 W, about 450 W, about 475 W, about 500 W, about 525 W, about 550 W, about 575 W, or about 600 W), and a plasma processing time of about 1 sec to about 600 sec (e.g., about 1 sec, about 10 sec, about 60 sec, about 100 sec, about 120 sec, about 180 sec, about 240 sec, about 300 sec, about 360 sec, about 420 sec, about 480 sec, about 540 sec, or about 600 sec).

3) Complexing

The surface-treated basalt fiber serving as the reinforcement and the thermoplastic resin serving as the matrix are complexed through a melt-mixing process, thus obtaining a composite material. The complexing process may be performed using a mixer (Haake internal mixer) and a twin-screw extruder, and the stirring rate of the mixer and the extrusion pressure of the extruder may be set within typical ranges during the complexing process.

A better understanding of the present invention will be given of the following Examples, which are set forth to illustrate but are not to be construed as limiting the present invention.

EXAMPLES

The following examples illustrate the invention and are not intended to limit the same.

Test Example 1: Evaluation of Properties of Composite Material Depending on Amount of Fiber Reinforcement In Test Example 1, in which composite materials are obtained by adding a reinforcement to a nylon 66 thermoplastic resin, the properties of the composite materials are evaluated depending on the kind and amount of the fiber reinforcement.

Nylon 66 and the reinforcement were prepared in the amounts shown in Table 2 below. Thereafter, a melt-mixing process was performed using a Haake internal mixer and a twin-screw extruder to give individual composite materials, which were then hot pressed, thus manufacturing test samples.

Table 2 below shows the compositions of the composite materials and the properties of the test samples.

[Measurement of Properties of Test Sample]

(1) Specific gravity: measurement by ASTM D792

(2) Flexural strength: measurement by ASTM D638

(3) Flexural modulus: measurement by ASTM D790

(4) Izod impact strength (23° C.): measurement by ASTM D256

TABLE 2

| Classification | | | Reference Example | | | | | |
|---|---|---|---|---|---|---|---|---|
| | | | 1 | 2 | 3 | 4 | 5 | 6 |
| Composite material (wt%) | Thermoplastic resin | Nylon 66 | 80 | 90 | 80 | 70 | 60 | 50 |
| | Reinforcement | Glass fiber | 20 | 0 | 0 | 0 | 0 | 0 |
| | | Basalt fiber | 0 | 10 | 20 | 30 | 40 | 50 |
| Properties | Specific gravity | | 1.245 | 1.232 | 1.253 | 1.345 | 1.465 | 1.572 |
| | Tensile strength (MPa) | | 92.3 | 89.7 | 102.1 | 138.4 | 178.6 | 203.2 |
| | Flexural strength (MPa) | | 124.5 | 119.3 | 127.9 | 173.7 | 202.3 | 243.8 |
| | Flexural modulus (GPa) | | 3.2 | 3.2 | 3.4 | 4.8 | 7.1 | 8.5 |
| | Impact strength (KJ/m$^2$) | | 3.5 | 3.5 | 3.8 | 5.8 | 7.5 | 10.0 |

Reference Examples 1 and 3 show the properties of the composite materials in which the nylon 66 thermoplastic resin was added with 20 wt % of each of glass fiber reinforcement and basalt fiber reinforcement. In Reference Examples 1 and 3, the properties of the basalt-fiber-reinforced composite material (Reference Example 3) were increased by about 10% compared to those of the glass-fiber-reinforced composite material (Reference Example 1) using the same amount of the reinforcement.

Reference Examples 2 to 6 show the properties of the composite materials in which the nylon 66 thermoplastic resin was added with the basalt fiber reinforcement in the amount range of 10 to 50 wt %. In Reference Examples 2 to 6, as the amount of the basalt fiber was increased, the properties of the composite material were improved. The properties of the composite material including the basalt fiber in an amount of less than 10 wt % were inferior, and on the other hand the improvement in the properties thereof was insignificant when the basalt fiber was added in an amount of 50 wt %. Based on the results of Reference Examples 2 to 6, the basalt fiber as the reinforcement in the thermoplastic resin is added in an amount of 10 to 50 wt %, and taking into consideration all of specific gravity and properties, the amount of the basalt fiber preferably falls in the range of 20 to 40 wt %.

Test Example 2: Evaluation of Surface Treatment Effects Using Silane Compound

In Test Example 2, in which composite materials are configured to include a nylon 66 thermoplastic resin and a basalt fiber reinforcement, the surface treatment effects are evaluated depending on the kind and amount of the silane compound that is used for the surface treatment of the reinforcement.

The surface treatment of the basalt fiber was performed using a dipping process. The silane compound was diluted at a concentration of 0.2 wt % in a mixed solvent of ethanol and deionized water at a weight ratio of 95:5, followed by stirring for 30 min and hydrolysis, thus preparing a dipping solution. The basalt fiber was impregnated with the dipping solution for 2 hr, taken out of the solution, dried in an oven at 120° C. for 30 min, and completely dried at room temperature.

Test samples were manufactured in the same manner as in Test Example 1 and the properties thereof were measured. Table 3 below shows the compositions of the composite materials and the properties of the test samples.

[Silane Compound]
(1) Amine-based silane: N-2-aminoethyl-3-aminopropyltrimethoxysilane
(2) Epoxy-based silane: 3-glycidoxypropylene trimethoxysilane
(3) Ureido-based silane: 3-ureidopropyltrialkoxysilane

TABLE 3

| Classification | | Reference Example | Example | | | | | | | |
|---|---|---|---|---|---|---|---|---|---|---|
| | | 3 | 1 | 2 | 3 | 4 | 5 | 6 | 7 | 8 |
| Composite material (wt%) | Nylon 66 | 80 | 78 | 78 | 78 | 79.9 | 79.5 | 79 | 75 | 70 |
| | Basalt fiber | 20 | 20 | 20 | 20 | 20 | 20 | 20 | 20 | 20 |
| | Amine-based silane | 0 | 2 | 0 | 0 | 0.1 | 0.5 | 1 | 5 | 10 |
| | Epoxy-based silane | 0 | 0 | 2 | 0 | 0 | 0 | 0 | 0 | 0 |
| | Ureido-based silane | 0 | 0 | 0 | 2 | 0 | 0 | 0 | 0 | 0 |
| Properties | Specific gravity | 1.253 | 1.251 | 1.253 | 1.252 | 1.254 | 1.253 | 1.256 | 1.254 | 1.254 |
| | Tensile strength (MPa) | 102.1 | 110.1 | 108.3 | 106.8 | 106.1 | 108.7 | 110.3 | 109.2 | 107.8 |
| | Flexural strength (MPa) | 127.9 | 138.6 | 136.5 | 136.2 | 134.5 | 138.4 | 140.8 | 138.7 | 137.8 |
| | Flexural modulus (GPa) | 3.4 | 3.6 | 3.5 | 3.5 | 3.5 | 3.6 | 3.7 | 3.6 | 3.5 |
| | Impact strength (KJ/m$^2$) | 3.8 | 4.0 | 4.0 | 4.0 | 3.8 | 4.0 | 4.0 | 3.9 | 3.8 |

In Reference Example 3 and Examples 1 to 3, when the basalt fiber was surface-treated with the silane compound, the properties of the composite materials were greatly improved. Moreover, in Examples 1 to 3, when the amine-based silane was used as the silane compound, the effect of increasing the properties of the composite material was the greatest.

Figure 2:
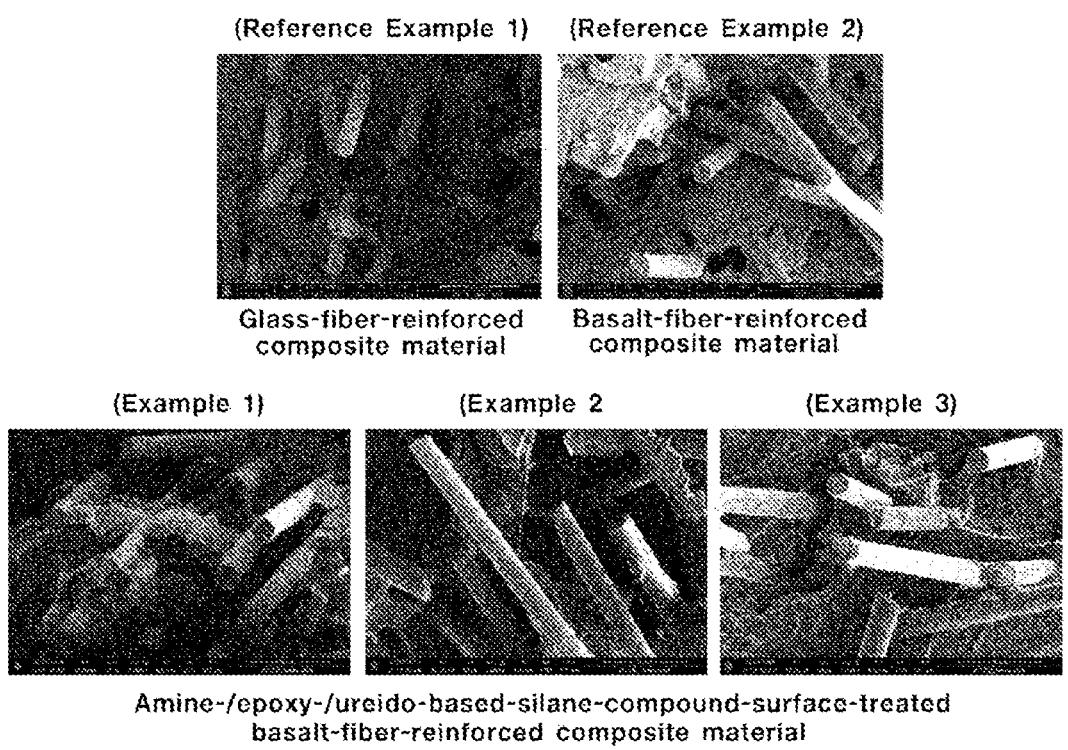
FIG. 2 shows scanning electron microscope (SEM) images for comparing the extents of interfacial adhesion between a nylon 66 resin and a reinforcement, Reference Example 1 illustrating a glass-fiber-reinforced nylon 66 composite material, Reference Example 3 illustrating a basalt-fiber-reinforced nylon 66 composite material, and Examples 1 to 3 illustrating silane-compound-surface-treated basalt-fiber-reinforced nylon 66 composite materials.

FIG. 2 shows the SEM images of the results of interfacial adhesion between the nylon 66 resin and the basalt fiber. The composite material including the basalt fiber that was not surface-treated with the silane compound (Reference Example 3) caused fiber pullout, whereas the composite materials of Examples 1 to 3 were configured such that the nylon 66 resin was efficiently attached to the surface of the basalt fiber.

In Examples 4 to 8, the effects depending on the amount of the silane compound are shown. When the amount of the silane compound was less than 0.1 wt %, the improvement in properties was insignificant (Example 4), but as the amount of the silane compound was increased, the properties of the composite material were improved. However, when the amount of the silane compound was 5 wt %, the properties deteriorated, and when the amount thereof exceeded 10 wt %, the properties were remarkably deteriorated. Based on the results of Examples 4 to 8, the amount of the silane compound is set to the range of 0.1 wt % to 10 wt % based on the weight of the composite material. Taking into consideration all of specific gravity and properties, the amount of the silane compound preferably falls in the range of 0.5 to 5 wt %.

Test Example 3: Evaluation of Surface Treatment Effects Using Silane Compound and Plasma In Test Example 3, in which composite materials are configured to include a nylon 66 thermoplastic resin and a basalt fiber reinforcement, the properties of the composite materials are evaluated when the fiber reinforcement is subjected to additional plasma treatment after surface treatment with the silane compound as in Test Example 2.

Plasma treatment was conducted using a continuous room-temperature atmospheric-pressure plasma device. Specifically, the basalt fiber surface-treated with the silane compound was placed in a chamber, and argon gas, serving as an inert gas, and oxygen gas, serving as an active gas, were fed at predetermined flow rates in the chamber under a certain plasma power (W) so that the fiber was surface-treated.

Test samples were manufactured in the same manner as in Test Example 1, and the properties thereof were measured. Table 4 below shows the plasma processing conditions and the properties of the composite material samples.

TABLE 4

| Classification | | 6 | 9 | 10 | 11 | 12 | 13 | 14 | 15 | 16 |
|---|---|---|---|---|---|---|---|---|---|---|
| Composite material (wt%) | Nylon 66 | 79 | 79 | 79 | 79 | 79 | 79 | 79 | 79 | 79 |
| | Basalt fiber | 20 | 20 | 20 | 20 | 20 | 20 | 20 | 20 | 20 |
| | Amine-based silane | 1 | 1 | 1 | 1 | 1 | 1 | 1 | 1 | 1 |
| Plasma treatment | Ar flow rate (sccm) | — | — | — | — | — | 100 | 100 | 100 | 100 |
| | $O_2$ flow rate (sccm) | — | 50 | 50 | 50 | 50 | 50 | 50 | 50 | 50 |
| | Plasma intensity (W) | — | 100 | 100 | 100 | 100 | 100 | 100 | 100 | 100 |
| | Processing time (sec) | — | 30 | 60 | 90 | 120 | 30 | 60 | 90 | 120 |
| Properties | Specific gravity | 1.256 | 1.254 | 1.255 | 1.254 | 1.254 | 1.253 | 1.256 | 1.255 | 1.254 |
| | Tensile strength (MPa) | 110.3 | 117.4 | 120.5 | 118.8 | 116.0 | 118.1 | 122.4 | 119.4 | 116.2 |
| | Flexural strength (MPa) | 140.8 | 148.3 | 151.4 | 148.4 | 146.3 | 149.4 | 155.3 | 150.1 | 147.2 |
| | Flexural modulus (GPa) | 3.7 | 3.8 | 3.9 | 3.9 | 3.7 | 3.8 | 3.9 | 3.8 | 3.7 |
| | Impact strength (KJ/m$^2$) | 4.0 | 4.0 | 4.1 | 4.1 | 3.9 | 4.0 | 4.1 | 4.1 | 4.0 |

As is apparent from Table 4, in the composite materials including the basalt fiber subjected to surface treatment with the silane compound and then to plasma surface treatment (Examples 9 to 16), the properties were increased by a maximum of 10%, compared to the composite material including the basalt fiber surface-treated with the silane compound (Example 6). In particular, when the plasma surface treatment was additionally performed, the properties were improved but the specific gravity was only slightly changed, or was decreased.

In Examples 9 to 12, the plasma treatment was conducted using oxygen gas ($O_2$) alone without any inert gas. As the plasma processing time was increased, there were changes in the properties. When the processing time was about 60 sec, the properties were maximally increased, and a processing time exceeding 120 sec resulted in deteriorated properties.

In Examples 13 to 16, the plasma treatment was conducted using a gas mixture comprising argon gas as the inert gas and oxygen gas as the active gas. Compared to the composite materials using oxygen ($O_2$) alone (Examples 9 to 12), the properties of the composite materials using the gas mixture comprising oxygen ($O_2$) and argon (Ar) were further improved. When the plasma treatment was carried out for about 60 sec even under the condition that the gas mixture comprising oxygen ($O_2$) and argon (Ar) was fed, like the use of oxygen ($O_2$) alone, the properties were maximally increased, and processing times exceeding 120 sec resulted in deteriorated properties.

Test Example 4: Evaluation of Surface Treatment Effects Using Silane Compound and Plasma In Test Example 4, in which composite materials are obtained by subjecting the basalt fiber reinforcement to surface treatment with the silane compound and then to additional plasma treatment as in Test Example 3, the properties of the composite materials are evaluated depending on the plasma processing conditions, including the oxygen gas ($O_2$) flow rate or the plasma intensity.

Table 5 below shows the results of measurement of properties of composite material samples depending on the plasma processing conditions.

Table 5

|  |  | Example | | | | | |
| --- | --- | --- | --- | --- | --- | --- | --- |
| Classification | | 17 | 18 | 19 | 20 | 21 | 22 |
| Composite material (wt%) | Nylon 66 | 79 | 79 | 79 | 79 | 79 | 79 |
| | Basalt fiber | 20 | 20 | 20 | 20 | 20 | 20 |
| | Amine-based silane | 1 | 1 | 1 | 1 | 1 | 1 |
| Plasma treatment | Ar flow rate (sccm) | 100 | 100 | 100 | 100 | 100 | 100 |
| | $O_2$ flow rate (sccm) | 25 | 75 | 100 | 50 | 50 | 50 |
| | Plasma intensity (W) | 100 | 100 | 100 | 50 | 150 | 200 |
| | Processing time (sec) | 60 | 60 | 60 | 60 | 60 | 60 |
| Properties | Specific gravity | 1.255 | 1.254 | 1.255 | 1.255 | 1.254 | 1.255 |
| | Tensile strength (MPa) | 120.5 | 119.5 | 115.2 | 118.6 | 124.2 | 119.1 |
| | Flexural strength (MPa) | 150.3 | 148.2 | 146.2 | 148.4 | 155.9 | 151.2 |
| | Flexural modulus (GPa) | 3.9 | 3.8 | 3.7 | 3.8 | 4.0 | 3.9 |
| | Impact strength ($KJ/m^2$) | 4.0 | 4.0 | 3.8 | 4.0 | 4.2 | 4.1 |

In Examples 17 to 19, the effects depending on the oxygen gas ($O_2$) flow rate can be seen. As the oxygen gas ($O_2$) flow rate was increased, the properties of the composite materials were decreased. When the $O_2$ flow rate was 75 sccm or more, the properties were deteriorated, and when the $O_2$ flow rate reached 100 sccm, the surface characteristics of the basalt fiber were greatly changed, thus deteriorating the properties.

In Examples 20 to 22, as the plasma intensity was increased, the surface of the basalt fiber was activated to thus improve the properties. The properties of the composite material were improved with an increase in the plasma intensity. However, when the plasma intensity exceeded 200 W, the properties of the composite material were deteriorated owing to the increased generation of surface defects.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a basalt-fiber-reinforced thermoplastic composite material, comprising:
   1-A) impregnating a basalt fiber with a dipping solution including an alkoxy-group-substituted silane compound so that the basalt fiber is surface-treated with the silane compound;
   1-B) subjecting the basalt fiber surface-treated with the alkoxy-group-substituted silane compound to plasma surface treatment under a condition that oxygen gas ($O_2$) is fed; and
   2) complexing the surface-treated basalt fiber with a thermoplastic resin,
       wherein the silane compound is an amine-based silane which is N-2-(aminoethyl)-3-aminopropyltrimethoxysilane,
       wherein the silane compound is used in an amount of 0.1 wt % to 5 wt % based on a total weight of the basalt-fiber-reinforced thermoplastic composite material,
       wherein the thermoplastic resin is engineering plastic of nylon 66,
       wherein the basalt fiber is surface-treated with plasma at an oxygen gas ($O_2$) flow rate of 10 sccm to 300 sccm, an inert gas flow rate of 10 sccm to 300 sccm, a plasma intensity of 10 W to 600 W, and a processing time of 1 sec to 600 sec, and
       wherein the surface of basalt fiber treated with plasma comprises at least one selected from the group consisting of a hydroxyl group, a carboxyl group, and a carbonyl group.

2. The method of claim 1, wherein 50 wt % to 90 wt % of the thermoplastic resin and 10 wt % to 50 wt % of the surface-treated basalt fiber are complexed based on a total weight of the basalt-fiber-reinforced thermoplastic composite material.

3. The method of claim 1, wherein the plasma surface treatment is performed under the condition that active oxygen gas and at least one inert gas selected from the group consisting of hydrogen, nitrogen and argon are fed.

4. The method of claim 1, wherein a fluorine-containing molecular gas is further fed upon the plasma surface treatment.

* * * * *